(12) United States Patent
James

(10) Patent No.: US 7,431,848 B2
(45) Date of Patent: Oct. 7, 2008

(54) MODULAR ULTRAVIOLET STERILIZER

(76) Inventor: Ron James, 209 Mohr St., Lake Elsinore, CA (US) 92530

( * ) Notice: Subject to any disclaimer, the term of this patent is extended or adjusted under 35 U.S.C. 154(b) by 231 days.

(21) Appl. No.: 11/212,546

(22) Filed: Aug. 26, 2005

(65) Prior Publication Data

US 2007/0048174 A1    Mar. 1, 2007

(51) Int. Cl.
C02F 1/32 (2006.01)
B01J 19/12 (2006.01)

(52) U.S. Cl. .................. 210/748; 210/232; 210/170.01; 210/259; 250/437

(58) Field of Classification Search ............... 210/748, 210/232, 167.01, 170.01, 170.02, 252, 259, 210/416.1, 416.2; 250/432 R, 433–438; 285/333, 30, 33
See application file for complete search history.

(56) References Cited

U.S. PATENT DOCUMENTS

| | | | |
|---|---|---|---|
| 278,800 A | 6/1883 | Kline | |
| 581,050 A | 4/1897 | Wentz | |
| D83,692 S | 3/1931 | Mayerhofer | |
| 2,340,890 A * | 2/1944 | Lang et al. | 250/429 |
| 2,461,619 A | 2/1949 | Wolcott | |
| 2,702,715 A | 2/1955 | Andrews | |
| 3,061,721 A * | 10/1962 | Brenner | 250/431 |
| 3,128,051 A | 4/1964 | Smith | |
| 3,408,093 A * | 10/1968 | Epstein | 285/52 |
| 3,493,116 A | 2/1970 | Edmiston | |
| 3,547,270 A | 12/1970 | Kass | |
| 3,600,009 A * | 8/1971 | Shupper | 285/52 |
| 3,707,233 A | 12/1972 | Lerner | |
| 3,834,537 A | 9/1974 | Brett | |
| 3,957,931 A | 5/1976 | Ellis et al. | |
| 4,009,099 A | 2/1977 | Jeris | |
| 4,105,555 A | 8/1978 | Pease | |
| 4,113,616 A | 9/1978 | Kaes | |
| 4,122,011 A | 10/1978 | Strigle, Jr. | |
| 4,200,536 A | 4/1980 | Kaufman | |
| 4,257,352 A | 3/1981 | Habegger | |
| 4,297,209 A | 10/1981 | DeVisser et al. | |
| 4,390,432 A * | 6/1983 | Takeguchi et al. | 210/748 |
| 4,415,454 A | 11/1983 | Fuchs | |
| 4,566,971 A | 1/1986 | Reimann et al. | |
| 4,623,464 A | 11/1986 | Ying et al. | |

(Continued)

OTHER PUBLICATIONS

"System 2000; The Ultmate Pond Filter", Aqua UltraViolet Sales Brochure, date unknown.

(Continued)

*Primary Examiner*—Fred Prince
(74) *Attorney, Agent, or Firm*—Knobbe Martens Olson & Bear, LLP

(57) ABSTRACT

Multiple UV sterilizers may be connected in series in order to increase the microorganism kill rate. The UV sterilizers are rotatable with respect to other UV sterilizers so that the UV sterilizers may be combined in various configurations in order to adjust a level of UV sterilization and allow combination of UV sterilizers in various configurations. For example, a combination of two or more UV sterilizers may be configured in a first orientation if the UV sterilizers are to be placed in a narrow space, while combination of the same UV sterilizers may be adjusted to another orientation if the sterilizers are to be placed in a large, open space.

23 Claims, 8 Drawing Sheets

U.S. PATENT DOCUMENTS

| | | | |
|---|---|---|---|
| 4,663,046 A | 5/1987 | Feldkirchner et al. | |
| 4,683,062 A | 7/1987 | Krovak et al. | |
| 4,753,726 A | 6/1988 | Suchanek | |
| 4,800,021 A | 1/1989 | Desbos | |
| 4,884,584 A | 12/1989 | Smith | |
| 4,909,931 A * | 3/1990 | Bibi | 210/85 |
| RE33,438 E | 11/1990 | Stewart | |
| 5,084,164 A | 1/1992 | Del Rosario | |
| 5,126,042 A | 6/1992 | Malone | |
| 5,160,039 A | 11/1992 | Colburn | |
| 5,217,616 A | 6/1993 | Sanyal et al. | |
| 5,288,412 A | 2/1994 | Voorhees et al. | |
| 5,290,439 A * | 3/1994 | Buchwald | 210/198.1 |
| 5,312,601 A | 5/1994 | Patrick | |
| D351,893 S | 10/1994 | Whitesel | |
| 5,393,419 A | 2/1995 | Tiede et al. | |
| 5,445,740 A | 8/1995 | Malone | |
| 5,458,779 A | 10/1995 | Odegaard | |
| 5,490,924 A | 2/1996 | Macia et al. | |
| 5,543,039 A | 8/1996 | Odegaard | |
| 5,545,335 A * | 8/1996 | Sween et al. | 210/748 |
| 5,569,416 A | 10/1996 | Cross | |
| 5,618,411 A | 4/1997 | Donner et al. | |
| 5,636,654 A | 6/1997 | Helm | |
| D386,254 S | 11/1997 | Lung-Ruey | |
| 5,689,871 A | 11/1997 | Carstensen | |
| D396,522 S | 7/1998 | Erdewyk et al. | |
| D409,714 S | 5/1999 | Stone | |
| 5,951,876 A | 9/1999 | Snowball | |
| 5,985,148 A | 11/1999 | Liu | |
| 6,015,490 A | 1/2000 | Katsukura et al. | |
| 6,080,304 A | 6/2000 | Gomi | |
| 6,086,765 A | 7/2000 | Edwards | |
| 6,090,294 A | 7/2000 | Teran et al. | |
| 6,120,691 A * | 9/2000 | Mancil | 210/748 |
| 6,209,926 B1 | 4/2001 | Mastro | |
| 6,267,882 B1 | 7/2001 | Houck et al. | |
| D451,978 S | 12/2001 | Hood et al. | |
| 6,363,598 B1 | 4/2002 | Staudt et al. | |
| 6,402,964 B1 | 6/2002 | Schmid | |
| 6,447,675 B1 | 9/2002 | James | |
| 6,578,876 B2 | 6/2003 | Guertin, Jr. | |
| 6,583,422 B2 * | 6/2003 | Boehme | 250/432 R |
| 6,685,826 B1 | 2/2004 | James | |
| 6,709,574 B2 | 3/2004 | James | |
| 6,740,235 B2 * | 5/2004 | Gill | 210/238 |
| 2003/0006178 A1 | 1/2003 | James | |
| 2003/0145892 A1 | 8/2003 | Maldavs | |
| 2004/0140576 A1 | 7/2004 | La Crosse | |
| 2005/0062283 A1 | 3/2005 | Hawkinson et al. | |

OTHER PUBLICATIONS

"Suspended Carrier Processes"; Purac/Technology/Suspended Carriers, http:/www.purac.se/se/suspend.htm, Apr. 4, 2000.

Rusten, Bjorn and Neu, Kenneth E., "Down to Size: Moving-bed Biofilm Reactors more into the small-flow treatment arena", Water Environment & Technology, Jan. 1999, pp. 27-33.

* cited by examiner

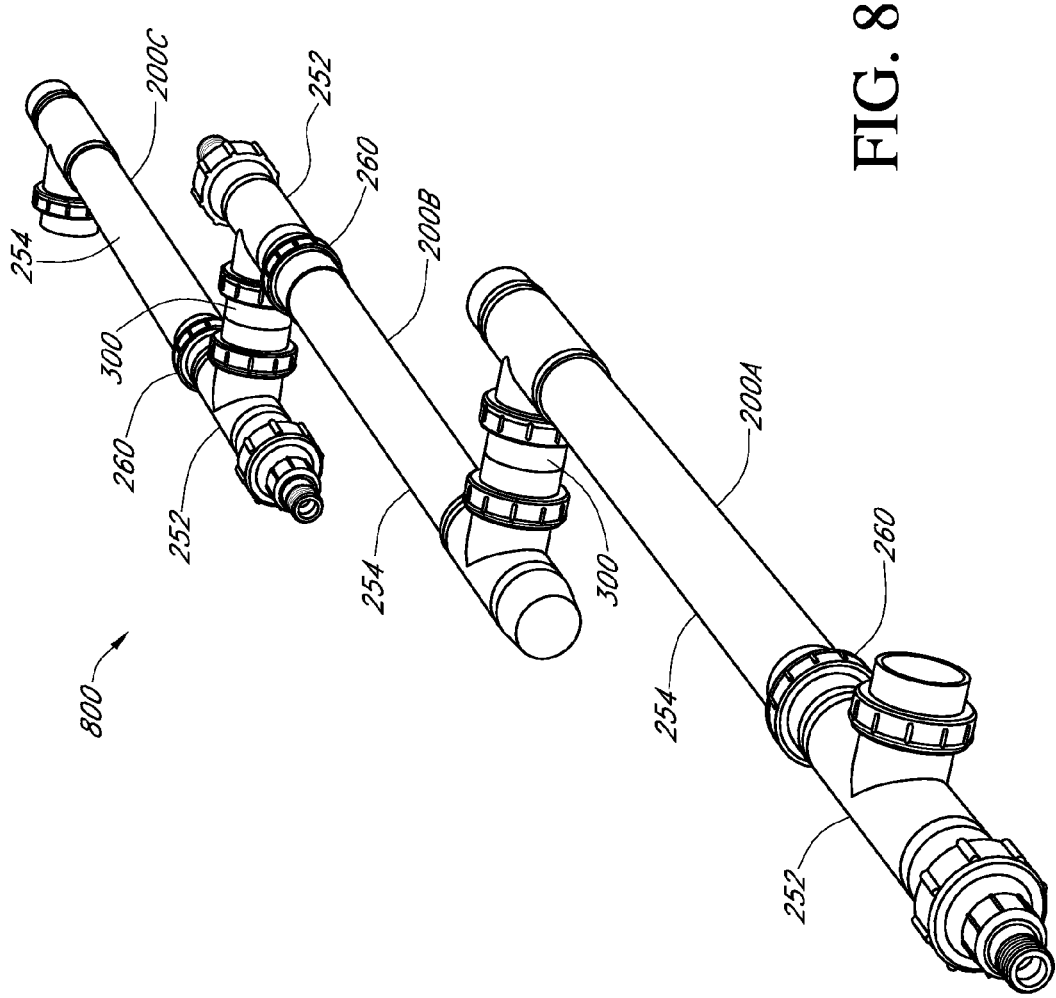

MODULAR ULTRAVIOLET STERILIZER

BACKGROUND OF THE INVENTION

1. Field of the Invention

This invention relates to devices and methods for sterilizing a body of water and, more particularly, to modular sterilization devices that may be used for sterilizing water from a fish pond.

2. Description of the Related Art

Bodies of water, such as those that are found outdoors, including fish ponds, are prone to contamination by bacteria, microorganisms, and other particles that reduce the purity of the water. Accordingly, systems and methods have been designed for reduction of these microorganisms and other unwanted particles in water. Some filtration systems comprise one or more containers with filter media enclosed therein, wherein the pond water is moved through the container and the filter media is configured to attract bacteria and other waste. For example, U.S. Pat. No. 6,685,826, titled "Fish Pond Filter System," which is hereby incorporated by reference in its entirety, describes such a filtration system. Other systems that included light emitters, such as ultraviolet (UV) emitters have been proposed for treatment of water that contains unwanted microorganisms or other waste. Such systems emit light, such as UV light that is intended to kill the bacteria and other microorganisms within the water.

As those of skill in the art will recognize, each fish pond has unique filtering requirements depending on several factors unique to each pond. For example, the size of a fish pond may have a large impact on the amount of filtration needed to maintain the pond water at an acceptable sterilization level. In addition, the location of each pond may also have a significant effect on the types of microorganisms present in the pond and, thus, the specific sterilization needs for the pond. Accordingly, a single filter or sterilizer may not provide a sufficient level of sterilization for many fish ponds. Thus, a filtration system that allows a user to easily increase a sterilization level is desired.

As those of skill in the art will also recognize, the space available for placement of a pond filtration system varies from one pond to another. Accordingly, a typical sterilizering system may not be easily installed near certain pond locations. Thus, systems and methods for allowing a filtration system to be arranged in various physical configurations are desired.

SUMMARY OF THE INVENTION

When a pond reaches a certain size, one UV sterilizer may not sufficiently remove and/or kill an acceptable level of bacteria. Thus, multiple UV sterilizers may be connected in series in order to increase the bacteria kill rate. In the past, connecting multiple UV sterilizers resulted in a cumbersome connection of sterilizers that often did not fit in the space available for the sterilizer. In one embodiment, improved UV sterilizers each comprise one or more coupling mechanisms that are rotatable with respect to other UV sterilizers. Accordingly two or more of the UV sterilizers may be combined in various configurations in order to adjust a level of UV sterilization. For example, a combination of two or more UV sterilizers may be configured in a first orientation if the UV sterilizers are to be placed in a narrow space, while combination of the same UV sterilizers may be adjusted to another orientation if the sterilizers are to be placed in a large, open space. Thus, according to the systems and methods described herein, combinations of multiple UV sterilizers may take on several configurations and, thus, may be adjusted for fitting in various spaces.

In one embodiment, a water sterilization system for an ornamental body of water comprise a pump configured to create a water flow through the filtration system so as to recirculate water out of the ornamental body of water into a filtration path of the sterilization system and then back to the ornamental body of water, and a plurality of sterilization elements configured to form at least a portion of the filtration path, each of the plurality of elements having an inlet and an outlet and defining an elongate space therebetween, wherein a sterilizing element is positioned within the elongate space so as to sterilize organic materials in the water flow as the water travels through the elongate space and wherein at least one of the inlet and outlet includes a coupling that permits interconnection to other ones of the plurality of filter elements such that the plurality of filter elements can be rotated with respect to each other to permit the plurality of filter elements to have a selectable configuration and such that the length of the filtration path can be adjusted by adding or removing one or more of the plurality of filter elements.

In another embodiment, a sterilizer comprises a first housing comprising a receiving opening configured to receive a fluid, the receiving opening oriented in a first direction, a second housing rotatably attached to the first housing, the second housing comprising a discharge opening configured to discharge a fluid, the discharge opening being oriented in a second direction, wherein a difference between the first and second directions may be adjusted by rotating the first housing with respect to the second housing around a first axis, an ultraviolet light source positioned inside at least one of the first and second housings, and a first coupling member substantially surrounding the receiving opening, the first coupling member being configured to rotatably couple the sterilizer with another sterilizer, wherein the sterilizer may be rotated with respect to the another sterilizer around a second axis, wherein the first and second axes intersect.

In another embodiment, a coupling is configured to substantially seal a connection between two sterilizers. In one embodiment, the coupling comprises a substantially cylindrical central body having a longitudinal axis extending along a length of the central body, a first moveable ring disposed around a first end of the central body, the first moveable ring being rotatable about the longitudinal axis and having internal threads configured to threadedly engage external threads of a first sterilizer, and a second moveable ring disposed around a second end of the central body, the second moveable ring being rotatable about the longitudinal axis and having internal threads configured to threadedly engage external threads of a second sterilizer.

In another embodiment, a combination of UV sterilizers comprises a plurality of UV sterilizers, each of the sterilizers having an intake and discharge opening, the position of the intake and discharge openings being rotatable around a first axis, and a plurality of couplers coupling the plurality of UV sterilizers in a series configuration, wherein the couplers allow adjacent UV sterilizers to be rotated with respect to one another around a second axis so that the combination of UV sterilizers may be arranged in multiple configurations.

In another embodiment, a combination of UV sterilizers comprises a first sterilizer housing a first UV emitter and being configured to receive a fluid from an ornamental pond in a first receiving opening and to discharge the fluid from a first discharge opening, a second sterilizer housing a second UV emitter and being configured to receive in a second receiving opening the fluid from the first discharge opening, and to discharge the fluid from a second discharge opening, wherein the first and second sterilizer each sterilize the water, a coupling configured to couple the first discharge opening with the second receiving opening so that the first and second sterilizers may be rotated with respect to one another without significantly affecting flow of the fluid through the sterilizers.

BRIEF DESCRIPTION OF THE DRAWINGS

FIG. 8 is a perspective view of three UV sterilizers coupled in a third configuration.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1:
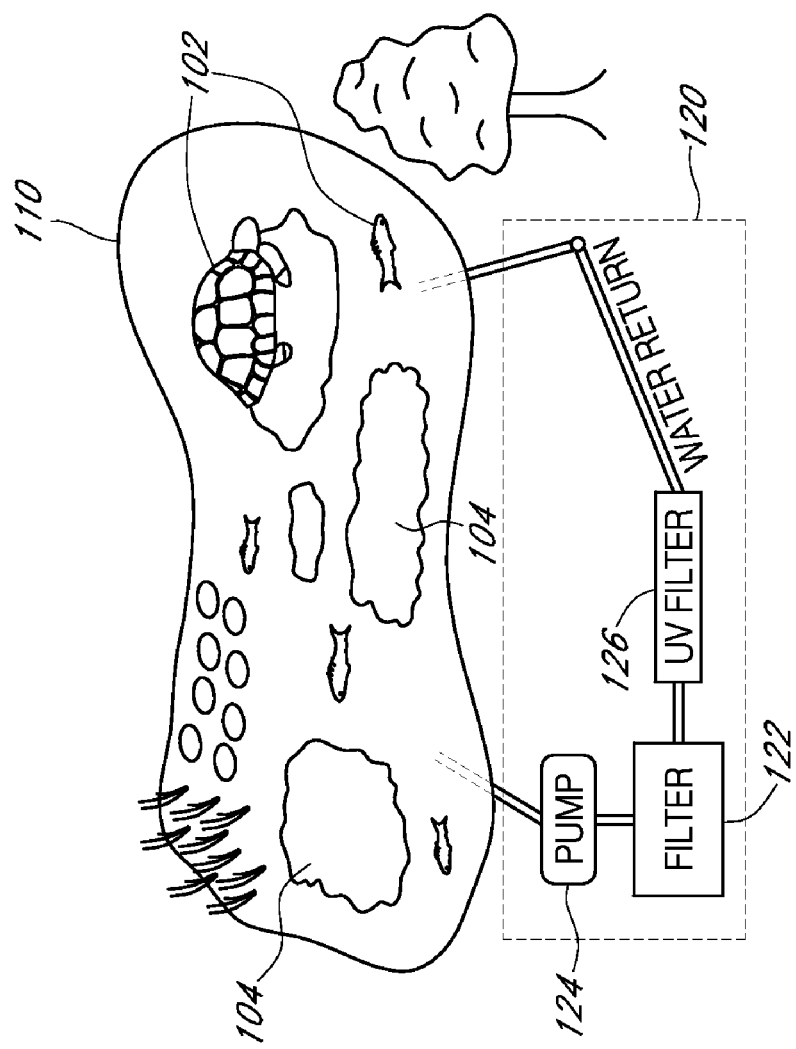
FIG. 1 is a diagram of a fish pond having a sterilizing system coupled to the fish pond.

FIG. 1 is a diagram of a filtering and sterilizing system 120 connected to sterilize water from a fish pond 110. In the embodiment of FIG. 1, the fish pond sterilizing system 120 draws water from the fish pond 110, filters and treats the water to remove waste 104, and returns at least a portion of the water to the fish pond 110. The fish pond 110 may be outside or placed within a building or other enclosed structure. In one embodiment, for example, the fish pond 110 is an open air, closed-system container of water. The fish pond 110 may be home to a plurality of live organisms 102, including fish, crawdads, mud puppies, frogs, turtles, shrimps, or any other vertebrate or invertebrate animals suited to live at least partially in an aquatic environment. The organisms 102 generate waste 104, which may be partially semi-solid biological waste material. Waste 104 shall be herein understood to also include other material that may be found in the fish pond 110, such as leaves, vegetable matter, dirt, or insects, for example.

In the embodiment of FIG. 1, the fish pond sterilizing system 120 comprises a filter 122 that is positioned and adapted to screen out larger waste particles, such as those that may be larger than about 1/8". The exemplary sterilizing system 120 also includes a pump 124 and a UV sterilizer 126. The pump 124 is configured to displace water from the fish pond 110 and discharge the pond water into the filter 122. The pump 124 may comprise any one of a plurality of water pumps that are well known in the art. The UV sterilizer 126 comprises an opening for receiving the water that has been filtered by the filter 122 and an opening for returning the water to the fish pond 110. As described below, the UV sterilizer 126 may advantageously comprise one or more modular UV sterilizers that can be arranged in multiple configurations. The pond sterilizing system 120 is exemplary and is not intended as limiting of the configurations of similar sterilizing systems. For example, in another sterilizing system, the sterilizer 122 may not be included. In other embodiments, additional sterilizers and pumps may also be included. Additionally, while the UV sterilizers discussed herein are described with respect to an exemplary fish pond, they are intended for use with any body of water, such as ornamental bodies of water with, or without, fish, and may be used in any suitable sterilizing systems.

Figure 2:
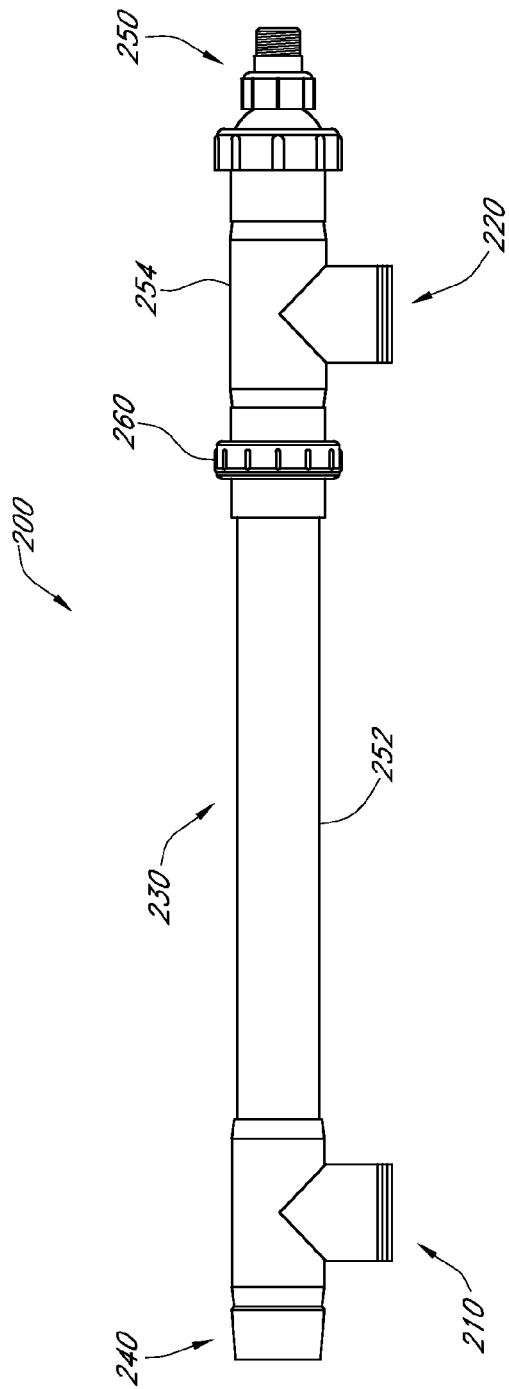
FIG. 2 is a side view of an exemplary UV sterilizer.

FIG. 2 is a side view of an exemplary UV sterilizer 200 having a longitudinal body 230, a first end 240, and a second end 250. In one embodiment, one or more UV emitters, such as UV lamps, are positioned inside the longitudinal body 230 of the UV sterilizer 200. In an advantageous embodiment, the UV sterilizer 200 comprises a first coupling mechanism 210 and a second coupling mechanism 220, wherein each of the coupling mechanisms 210, 220 are configured to couple with another sterilizer, such as another UV sterilizer similar to the ultraviolet sterilizer 200. When the sterilizer 200 is coupled with an additional sterilizer via one or more of the coupling mechanisms 210, 220, the sterilizing efficiency of the sterilizer combination may be improved. As described in further detail below, due to the configurability of the coupling mechanisms 210, 220, multiple UV sterilizers 200 may be combined in various configurations.

In the embodiment of FIG. 2, the coupling mechanisms 210, 220 each comprise a hollow cylinder having threads on a portion of the exterior surface. In one embodiment, one of the coupling mechanisms 210, 220 couples with a water intake, such as from a pond, while the other coupling mechanism 210, 220 couples with a water output, such as tubing that returns the sterilized water to the pond or to another sterilizer, for example.

In the embodiment of FIG. 2, the UV sterilizer 200 comprises a first portion 252 and a second portion 254 that are coupled with a rotatable coupling 260. In an advantageous embodiment, the rotatable coupling 260 allows the first and second portions 252, 254 to be rotated so that the relative orientations of the coupling mechanisms 210, 220 may be adjusted. In the embodiment of FIG. 2, the coupling mechanisms 210, 220 are oriented in the same direction (downward in the drawing of FIG. 2). However, the rotatable coupling 260 allows the first and second portions 252, 254 to be rotated with respect to one another so that the coupling mechanisms 210, 220 are oriented in different directions. For example, the first portion 252 may be rotated approximately 90 degrees so that the coupling mechanisms 210, 220 are oriented in perpendicular directions. Similarly, the first portion 252 may be rotated approximately 180 degrees so that the coupling mechanisms 210, 220 are oriented in opposite directions, e.g., the coupling mechanism 210 may face up while the coupling mechanism 220 remains facing down. Those of skill in the art will recognize that the first and second portions 252, 254 may be rotated in other amounts so that the axes of the coupling mechanisms 210, 220 are separated by between 0-360 degrees. As described in further detail below, because the coupling mechanisms 210, 220 are rotatable with respect to one another, additional sterilizers may be coupled to the sterilizer 200 so that the combination of sterilizers takes on countless configurations (see FIGS. 6-8, for example).

In one embodiment, the rotatable coupling 260 also provides an internal access mechanism that allows a user to access the inside of the longitudinal body 230, which typically houses one or more UV emitters. In one embodiment, the rotatable coupling 260 comprises a threaded circular ring on one of the first and second portions 252, 254 and a threaded receiving portion on the other of the first and second portions 252, 254. In this embodiment, the rotatable coupling engages the first and second portions 252, 254 of the UV sterilizer 200 by threadedly engaging male-oriented threads on one portion and female-oriented threads on the other portion thereby forming a substantially water tight connection between the first and second portions 252, 254. In one embodiment, the male-oriented threads are formed on an outer surface of the first portion 252 of the UV sterilizer 200 while the female-oriented threads are formed on a circular ring that surrounds the second portion 254 of the UV sterilizer. Thus, by engaging the threads on the first and second portions 252, 254, the first and second portions 252, 254 may be coupled together. As used herein, the term coupling mechanism refers generally to the coupling components disposed on respective portions of a UV sterilizer, which allows portions of the sterilizer to be rotated with respect to one another. In the embodiment of FIGS. 2, and 5-8, the coupling mechanism 260 comprises male and female oriented threaded coupling components. However, those of skill in the art will appreciate that other coupling mechanisms may be used to couple portions of a sterilizer, such as portions 252, 254 of the UV sterilizer 200. In an advantageous embodiment, the coupling mechanism allows portions of the sterilizer to be rotated with respect to one another.

Figure 3A:
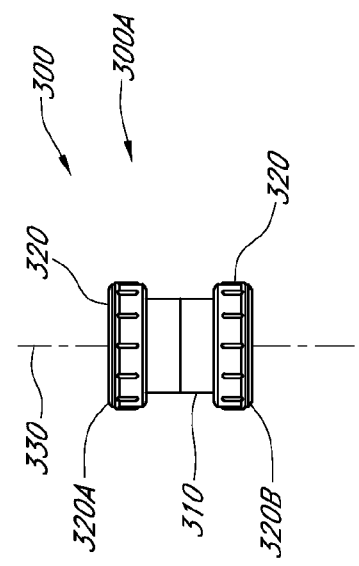
FIG. 3A is a side view of a sterilizer coupling mechanism.

FIG. 3A is a side view of a coupling 300 configured to couple multiple UV sterilizers 200 so that water flows through multiple UV sterilizers and is treated by UV emissions within the multiple sterilizers. The coupling 300 comprises a central body 310 and rotatable circular rings 320 on each side of the central body 310. A central axis 330 of the coupling 300 extends through the central body 310. The circular rings 320 are rotatable around the central axis 330. In the embodiment of FIG. 3A, each of the circular rings 320 comprise threads on an inner circumference of the circular rings 320. Advantageously, the circular rings 320 are sized so that the threaded inner circumference of the circular rings 320 threadedly engages with the coupling mechanisms 210, 220. In one embodiment, the coupling 300 is attached to the UV sterilizer 200 by placing the threaded ring 320A in contact with one of the coupling mechanisms 210, 220 and then rotating the circular ring 320A around the central body 310 so that the threads on the circular ring 320A engage the threads on the coupling mechanism 210, 220. In one embodiment, the circular rings 320 comprise a washer, such as a rubber washer, on an inner circumference of the circular ring 320, so that when engaged with a threaded cylinder, the coupling is sufficiently watertight.

Figure 3B:
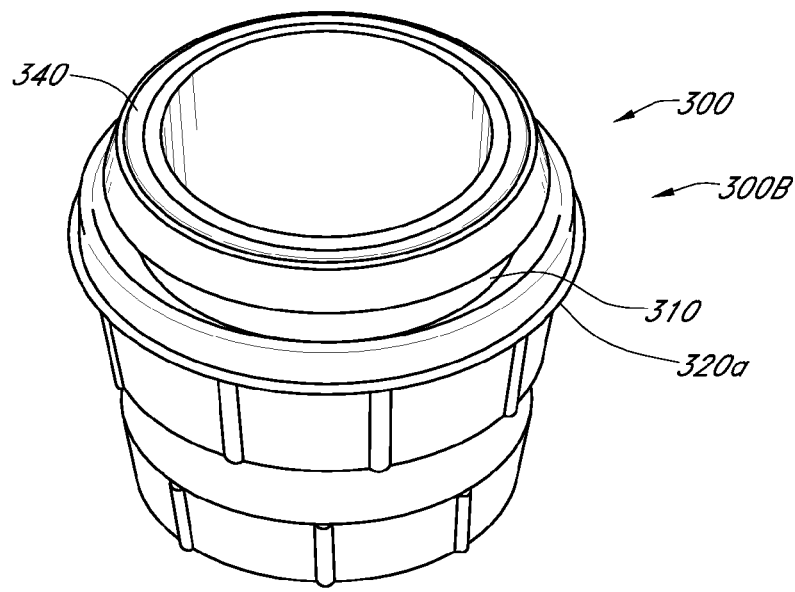
FIG. 3B is a side perspective view of the sterilizer coupling mechanism of FIG. 3A.
Figure 3C:
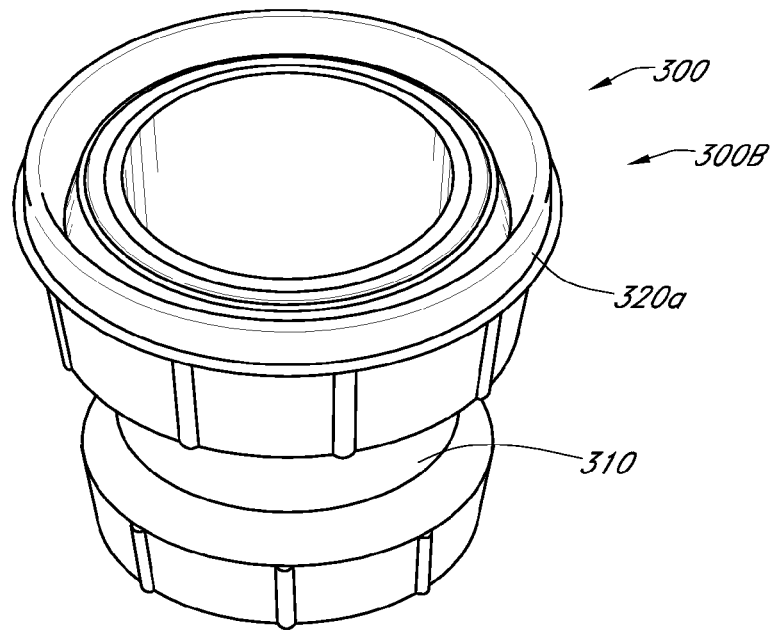
FIG. 3C is another side perspective view of the sterilizer coupling mechanism of FIG. 3A.

FIGS. 3B and 3C are side perspective views of the coupling 300 illustrated in FIG. 3A. As shown in FIG. 3B, the circular ring 320A is rotatable around the central body 310. More specifically, the circular ring 320A is at an outer edge of the central body 310 in FIG. 3C and the central ring 320A is near a center portion of the central body 310A in FIG. 3B. FIGS. 3B and 3C also illustrate a rubber washer 340 on the outer edge of the central body 310. In one embodiment, when the coupling 300 is engaged with a coupling mechanism, such as coupling mechanism 210, 220, the rubber washer 340 is preferably partially compressed by a surface of the coupling mechanism, thereby sealing the junction of the coupling 300 and the coupling mechanism and reducing water loss through the junction.

Figure 4:
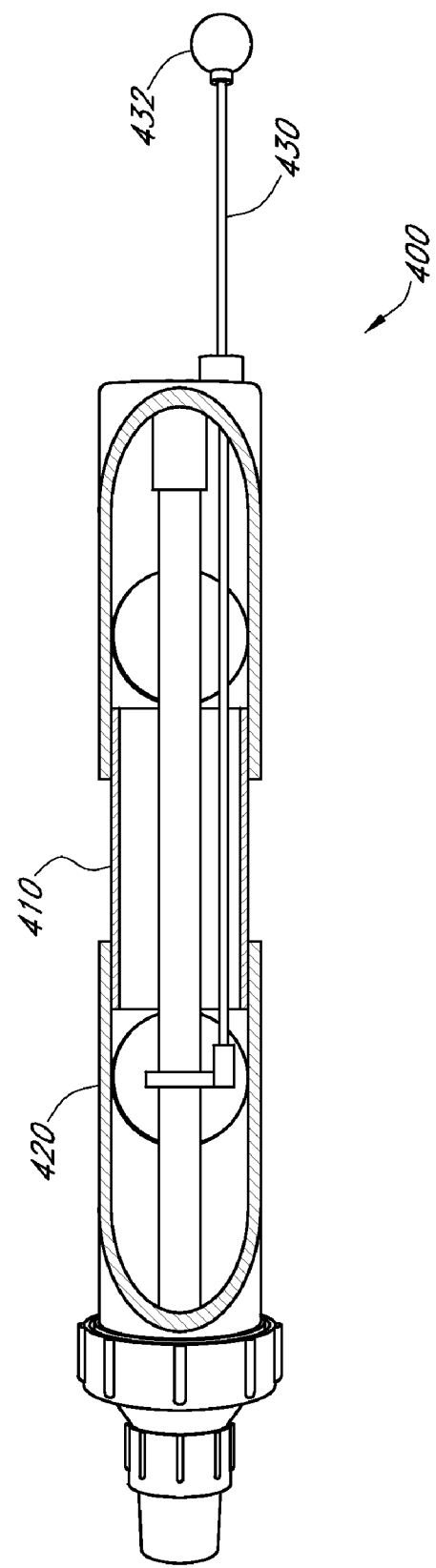
FIG. 4 is partially cut away side view of an exemplary UV sterilizer.

FIG. 4 is a partially cut-away side view of an exemplary ultraviolet sterilizer 400. As illustrated in FIG. 4, an ultraviolet emitter 410 extends along much of the length of the ultraviolet sterilizer 400. In one embodiment, the light source 410 is configured so that the wavelength and frequency of ultraviolet light emitted kills at least a portion of the bacteria and/or microorganisms that are typically found in a fish pond. The exemplary UV sterilizer 400 also comprises a cleaning mechanism 430 configured to clean an outer surface of the ultraviolet emitter 410. More particularly, the cleaning mechanism 430 includes a cleaning ring 420 that is coupled around an outer surface of the ultraviolet emitter 410 so that when a plunger 432 is moved along a longitudinal axis of the ultraviolet emitter 410, the ring wipes the outer surface of the ultraviolet emitter 410. In one embodiment, the cleaning ring 420 comprises a wiper on the inner circumference of the cleaning ring 420, wherein the wiper contacts the ultraviolet emitter 410. In one embodiment, the wiper comprises a rubber material, such as the material used in squeegees, so that materials that are attached to the outer surface of the emitter 410 are substantially removed from the emitter 410 as the wiper is moved across the surface of the emitter 410.

Figure 5:
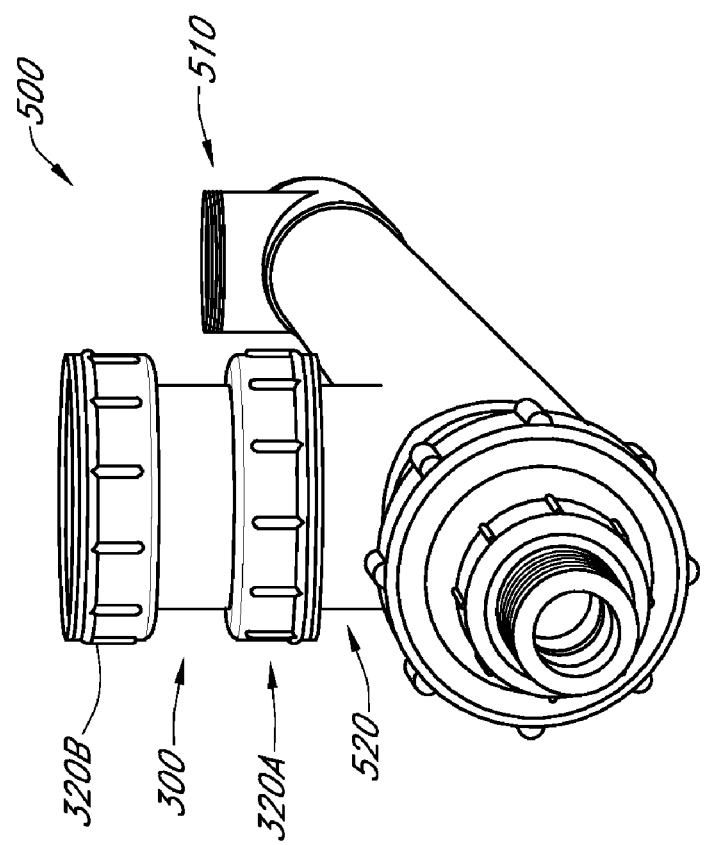
FIG. 5 is a top perspective view of the UV sterilizer illustrated in FIG. 2.

FIG. 5 is a perspective view of an ultraviolet emitter 500, including coupling mechanisms 510, 520. As illustrated in FIG. 5, the coupling mechanism 520 is coupled with a first circular ring 320A of the coupling 300. The second circular ring 320B may be coupled to (a) a water input, such as from a pond, (b) another sterilizer, such as the UV sterilizer 300, or (c) a water output, such as an output from the pond that returns sterilized water to the pond, for example. The coupling mechanism 510 may also be connected to a coupling 300, which may then be connected to any of the above listed apparatuses.

Figure 6:
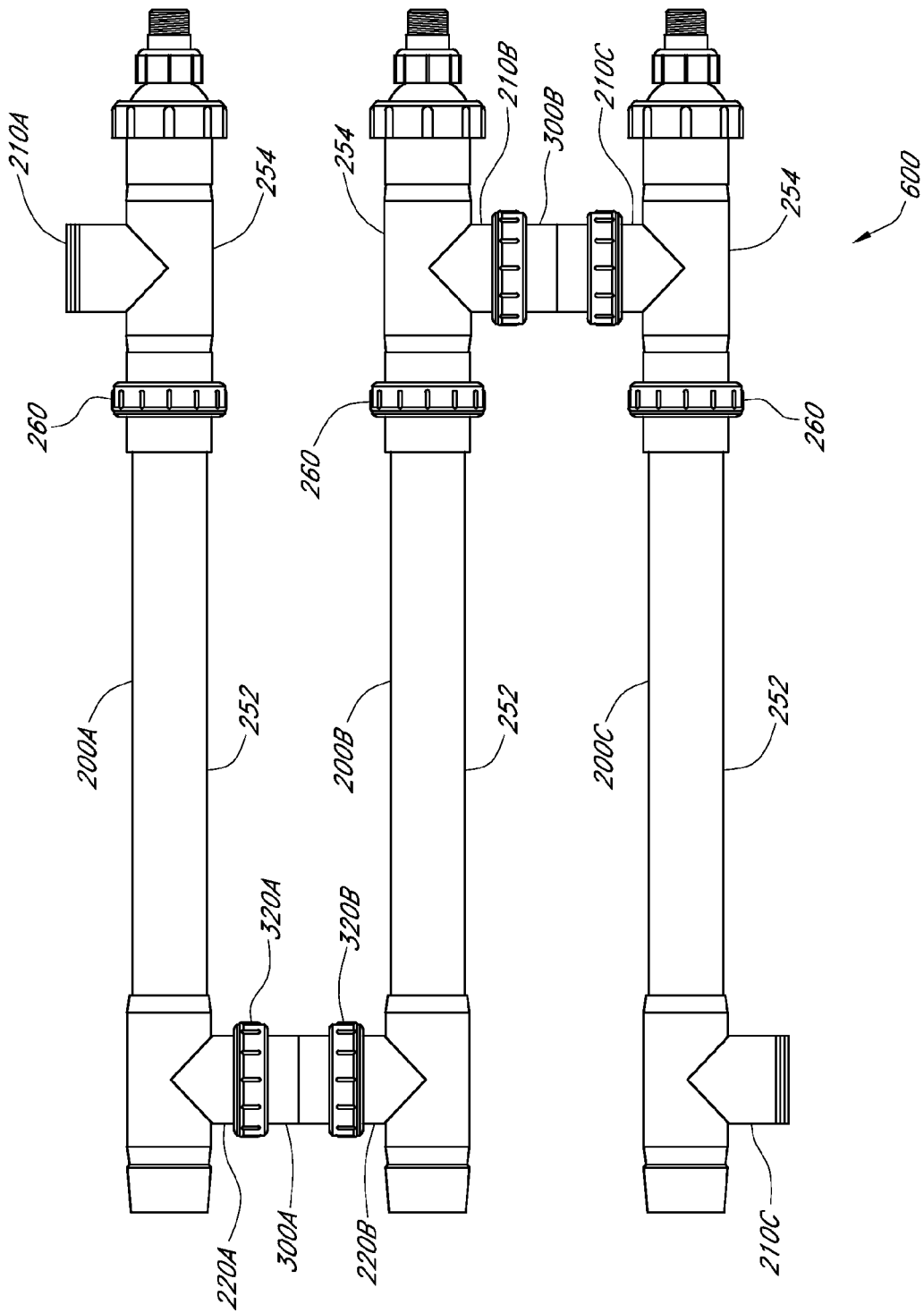
FIG. 6 is a side view of three UV sterilizers coupled in a first configuration.

FIG. 6 is a side view of a first combination of sterilizers 600 comprising three UV sterilizers 200A, 200B, 200C coupled in a first configuration. As illustrated in FIG. 6, the UV sterilizers 200 are each coupled to one or more additional UV sterilizers 200 with a coupling 300. Each of the UV sterilizers 200A, 200B, 200C comprise respective coupling mechanisms 210, 220. The sterilizers 200A, 200B, 200C each include a rotatable coupling 260 that couples first and second portions 252, 254 of each sterilizer. In the embodiment of FIG. 6, the first and second portions 252, 254 of each of the sterilizers 200A, 200B, 200C are rotated about the rotatable coupling 260 so that the coupling mechanisms 210, 220 of each sterilizer are oriented in opposite directions, e.g., an approximate 180 degree difference in the axes of the coupling mechanisms 210, 220. With the coupling mechanisms 210, 220 of each sterilizer 200A, 200B, 200C arranged in the configuration shown in FIG. 6, the combination of sterilizers 600 are substantially flat with the sterilizers 200A, 200B, 200C being substantially parallel to one another. In this exemplary configuration, the combination of sterilizers 600 may be suitable for placement underground or in a narrow space. In one embodiment, each of the UV sterilizers 200 may have different physical dimensions, UV emitters and sterilizering characteristics. For example, each of the emitters 200A, 200B, 200C may have UV emitters with different wavelengths and/or power levels.

In the embodiment of FIG. 6, the UV sterilizer 200A is coupled to UV sterilizer 200B with coupling 300A, wherein the circular ring 320A engages the coupling mechanism 220A of the sterilizer 200A and the circular ring 320B engages the coupling mechanism 220B of the UV sterilizer 200B in the manner described above with respect to FIG. 3. In an advantageous embodiment, the coupling 300A provides a channel between the UV sterilizer 200A and the UV sterilizer 200B so that water may flow between the UV sterilizers via the coupling 300A with substantially no water loss in the transfer.

Similarly, the coupling 300B couples the UV sterilizers 200B and 200C. Therefore, if water from a pond, or other water source, enters the combination of sterilizers 600 at the coupling mechanism 210A, the fluid passes through the UV sterilizer 200A, to the UV sterilizer 200B via the coupling 300A, through the sterilizer 200B and then through the coupling 300B and the UV sterilizer 200C. Advantageously, each of the UV sterilizers 200A, 200B, 200C provides UV emissions that are configured to destroy particles and/or microorganisms that may be found in a pond. In one embodiment, the combination of sterilizers 600 kills up to about three times the microorganisms as one of the UV sterilizers 200 alone.

Figure 7:
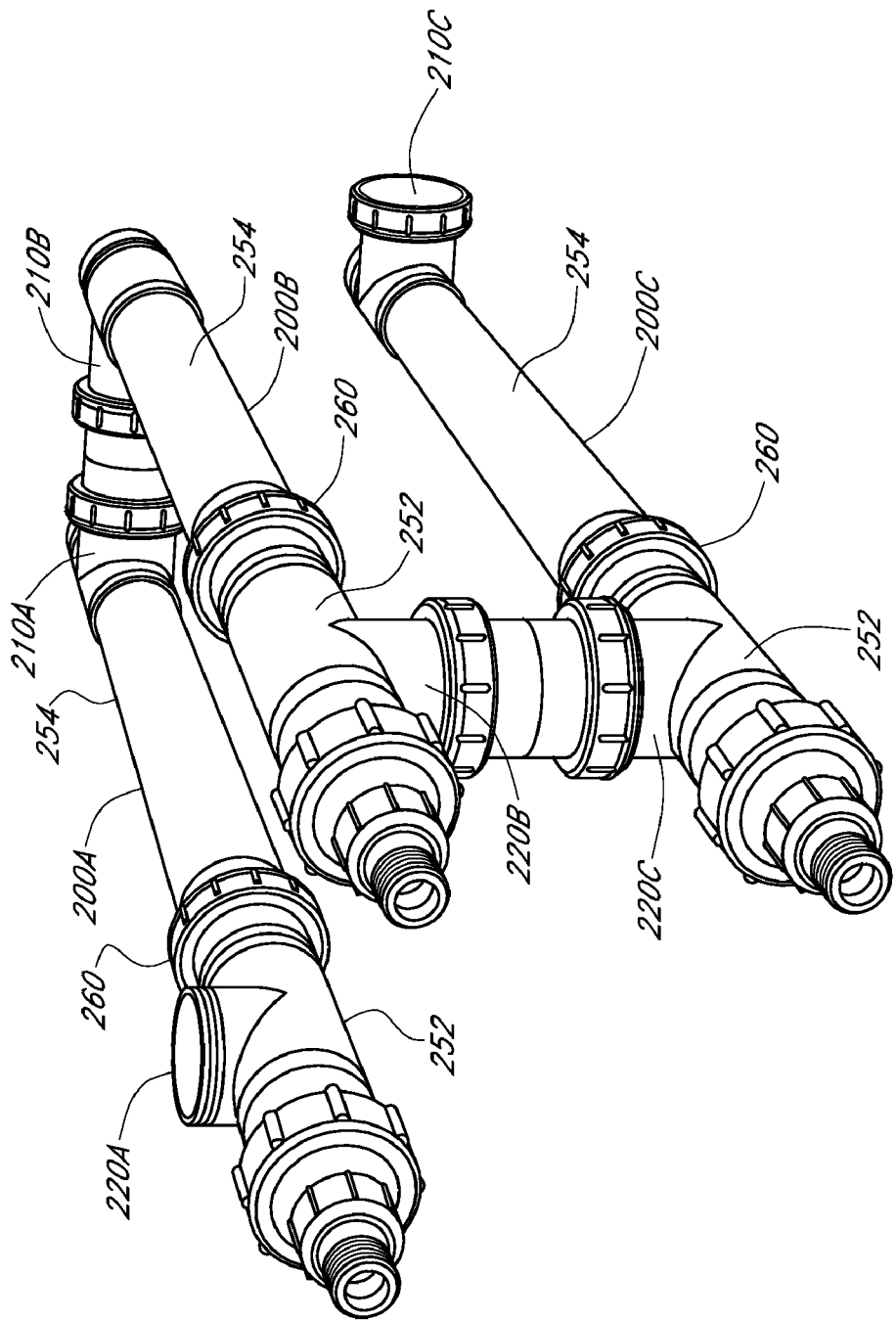
FIG. 7 is a perspective view of three UV sterilizers coupled in a second configuration.

FIG. 7 is a perspective view of a second combination of sterilizers 700. In the embodiment of FIG. 7, UV sterilizers 200A, 200B, 200C are arranged in a step configuration for placement in an available opening having a similar configuration. As those of skill in the art will recognize, the available landscape for installing a filtering and/or sterilizing system may vary greatly from one installation to another. Accordingly, the ability to couple multiple UV sterilizers in various configurations provides an increased ability to install additional UV sterilizers and/or more adequately place a combination of sterilizers in a desired area.

In FIG. 7, the sterilizers 200 each include a rotatable coupling 260 that couples first and second portions 252, 254 of each sterilizer. In the embodiment of FIG. 7, the first and second portions 252, 254 of each of the sterilizers 200A, 200B, 200C are rotated about the rotatable coupling 260 so that the coupling mechanisms 210, 220 of each sterilizer are oriented in perpendicular directions, e.g., an approximate 90 degree difference in the axes of the coupling mechanisms 210, 220. With the coupling mechanisms 210, 220 of each sterilizer 200A, 200B, 200C arranged in the configuration shown in FIG. 7, the sterilizers 200A, 200B, and 200C form a step configuration, where a microorganism kill rate may be increased by up to a factor of three when compared to a single UV sterilizer.

FIG. 8 is a perspective view of a third combination of UV sterilizers 800. As illustrated in FIG. 8, the same UV sterilizers 200A, 200B, and 200C are coupled in yet another configuration that may be better suited for placement near a pond that is being sterilized. As noted above, the sterilizers 200 each include a rotatable coupling 260 that couples first and second portions 252, 254 of each sterilizer. In the embodiment of FIG. 8, the first and second portions 252, 254 of each of the sterilizers 200A, 200B, 200C are rotated about the rotatable coupling 260 so that the coupling mechanisms 210, 220 of each sterilizer are oriented in opposite directions, e.g., an approximate 180 degree difference in the axes of the coupling mechanisms 210, 220. In addition, the sterilizers are rotated about the couplings 300 so that the bodies of the sterilizers substantially extend away from one another, forming a long, narrow combination of sterilizers 800. Similar to FIGS. 6 and 7, the sterilizers 200A, 200B, and 200C are in a series configuration that advantageously provides increased sterilization over a single UV sterilizer 200.

As can be seen from the combinations of UV sterilizers 600, 700, and 800, multiple UV sterilizers 200 may be combined in countless configurations, depending on the constraints for placement of the combination of sterilizers. The relative orientations of the UV sterilizers may be adjusted by rotating portions of sterilizers about a rotatable coupling 260 and/or by rotating coupled sterilizers about a coupling 300 that couples the sterilizers together. Although each of the combinations of UV sterilizers 600, 700, and 800 include three UV sterilizers 200, fewer or more UV sterilizers may be combined using the coupling 300, or a similar coupling. For example, in one embodiment six or more UV sterilizers 200 including first and second portions 252, 254 coupled with rotatable couplings 260 may be combined with couplings 300 connecting coupling mechanisms 220 of the UV sterilizers.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A water sterilization system for an ornamental body of water, the system comprising:
   a pump configured to create a water flow through the filtration system so as to recirculate water out of the ornamental body of water into a sterilization path of the sterilization system and then back to the ornamental body of water; and
   a plurality of sterilization elements configured to form at least a portion of the filtration path, each of the plurality of elements having an inlet and an outlet and defining an elongate space therebetween, wherein a sterilizing element is positioned within the elongate space so as to sterilize organic materials in the water flow as the water travels through the elongate space and wherein at least one of the inlet and outlet includes a coupling that permits interconnection to other ones of the plurality of sterilizing elements such that the plurality of sterilizing elements can be rotated with respect to each other to permit the plurality of sterilizing elements to have a selectable configuration and such that the length of the filtration path can be adjusted by adding or removing one or more of the plurality of sterilizing elements.

2. The system of claim 1, wherein the plurality of sterilizing elements comprise cylindrical members.

3. The system of claim 2, wherein the sterilizing elements comprise an elongate UV light tube that radiates UV light into the water flowing though the plurality of sterilizing elements so as to sterilize at least some organic material in the water flow.

4. The system of claim 1, further comprising a filter configured to contain particles that are larger than a predetermined size, wherein the filter comprises a portion of the filtration path.

5. The system of claim 1, further comprising one or more fluid flow pipes connecting the ornamental body of water to the sterilization elements.

6. The system of claim 1, further comprising one or more fluid flow pipes connecting the sterilization elements to the ornamental body of water.

7. A sterilizer comprising:
   a first housing comprising a receiving opening configured to receive a fluid, the receiving opening oriented in a first direction;

a second housing rotatably attached to the first housing, the second housing comprising a discharge opening configured to discharge a fluid, the discharge opening being oriented in a second direction, wherein a difference between the first and second directions may be adjusted by rotating the first housing with respect to the second housing around a first axis; an ultraviolet light source positioned inside at least one of the first and second housings; and a first coupling member substantially surrounding the receiving opening, the first coupling member being configured to rotatably couple the sterilizer with another sterilizer, wherein the sterilizer may be rotated with respect to the another sterilizer around a second axis, wherein the first and second axes intersect.

8. The sterilizer of claim 7, wherein the difference between the first and second directions is about 90 degrees.

9. The sterilizer of claim 7, wherein the difference between the first and second directions is about 180 degrees.

10. The sterilizer of claim 7, wherein the difference between the first and second directions is about 0 degrees.

11. The sterilizer of claim 7, wherein the first and second axes are orthogonal.

12. The sterilizer of claim 7, wherein the first and second housings are generally cylindrical.

13. The sterilizer of claim 7, wherein the receiving opening receives water from a fish pond.

14. The sterilizer of claim 13, wherein a wavelength of light emitted from the ultraviolet light source is set to kill at least some microorganisms in the water received from the fish pond.

15. A combination of UV sterilizers comprising:
a plurality of UV sterilizers, each of the sterilizers having an intake and discharge opening, the position of the intake and discharge openings being rotatable around a first axis;
a plurality of couplers coupling the plurality of UV sterilizers in a series configuration, wherein the couplers allow adjacent UV sterilizers to be rotated with respect to one another around a second axis so that the combination of UV sterilizers may be arranged in multiple configurations.

16. The combination of claim 15, wherein the combination of UV sterilizers are coupled so that each of the UV sterilizers are planar to one another.

17. The combination of claim 15, wherein the combination of UV sterilizers are coupled in an end-to-end configuration.

18. The combination of claim 15, wherein the combination of UV sterilizers are coupled to form a step-like configuration.

19. The combination of claim 15, wherein each of the couplers comprises:
a substantially cylindrical central body having a longitudinal axis extending along a length of the central body,
a first moveable ring disposed around a first end of the central body, the first moveable ring being rotatable about the longitudinal axis and having internal threads configured to threadedly engage external threads of a first sterilizer; and
a second moveable ring disposed around a second end of the central body, the second moveable ring being rotatable about the longitudinal axis and having internal threads configured to threadedly engage external threads of a second sterilizer.

20. A combination of UV sterilizers comprising:
a first sterilizer housing a first UV emitter and being configured to receive a fluid from an ornamental pond in a first receiving opening and to discharge the fluid from a first discharge opening;
a second sterilizer housing a second UV emitter and being configured to receive in a second receiving opening the fluid from the first discharge opening, and to discharge the fluid from a second discharge opening, wherein the first and second sterilizer each sterilize the water; and
a coupling configured to couple the first discharge opening with the second receiving opening so that the first and second sterilizers may be rotated with respect to one another without significantly affecting flow of the fluid though the sterilizers;
wherein the first sterilizer comprises a first cylindrical coupling mechanism having external threads and the second sterilizer comprises a second cylindrical coupling mechanism having external threads, the first and second cylindrical coupling mechanisms each comprising a cylindrical central body having a longitudinal axis extending along a length of the central body, a first moveable ring disposed around a first end of the central body, the first moveable ring having internal threads, wherein the first moveable ring is configured for engagement with the external threads of the first cylindrical coupling, and a second moveable ring disposed around a second end of the central body, the second moveable ring having internal threads, wherein the second moveable ring is configured for engagement with the external threads of the second cylindrical coupling.

21. The combination of claim 20, wherein the fluid discharged from the second discharge opening is returned to the ornamental pond.

22. The combination of claim 20, further comprising:
a third sterilizer housing a third UV emitter and being configured to receive in a third receiving opening the fluid from the second discharge opening, and to discharge the fluid from a third discharge opening, wherein each of the sterilizers are configured to sterilize the water.

23. The combination of claim 20, wherein the first sterilizer comprises an upper portion and a lower portion, the first opening being positioned in the upper portion and the second opening being positioned in the lower portion, the upper and lower portions being rotatably connected so that the relative positions of the first and second openings may be changed.

* * * * *

UNITED STATES PATENT AND TRADEMARK OFFICE
CERTIFICATE OF CORRECTION

PATENT NO.        : 7,431,848 B2                                         Page 1 of 1
APPLICATION NO.   : 11/212546
DATED             : October 7, 2008
INVENTOR(S)       : Ron James It is certified that error appears in the above-identified patent and that said Letters Patent is hereby corrected as shown below:

<u>Column 8</u>

Line 27-28 (Approx.), In Claim 1, change "filtration" to --sterilization--.

<u>Column 8</u>

Line 29 (Approx.), In Claim 1, change "sterilization" to --filtration--.

<u>Column 8</u>

Line 51 (Approx.), In Claim 3, change "though" to --through--.

<u>Column 10</u>

Line 23, In Claim 20, change "though" to --through--.

Signed and Sealed this

Seventeenth Day of March, 2009

JOHN DOLL
*Acting Director of the United States Patent and Trademark Office*